Jan. 12, 1971 A. T. BRACKEN ET AL 3,554,725
PATTERNED GLASS SHEET APPARATUS
Filed June 24, 1965 2 Sheets-Sheet 1
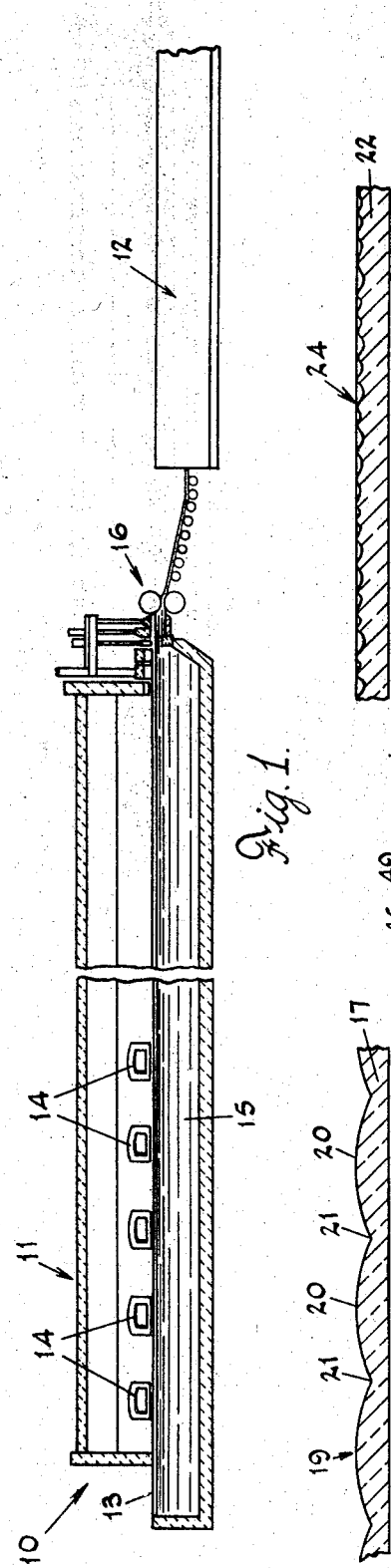
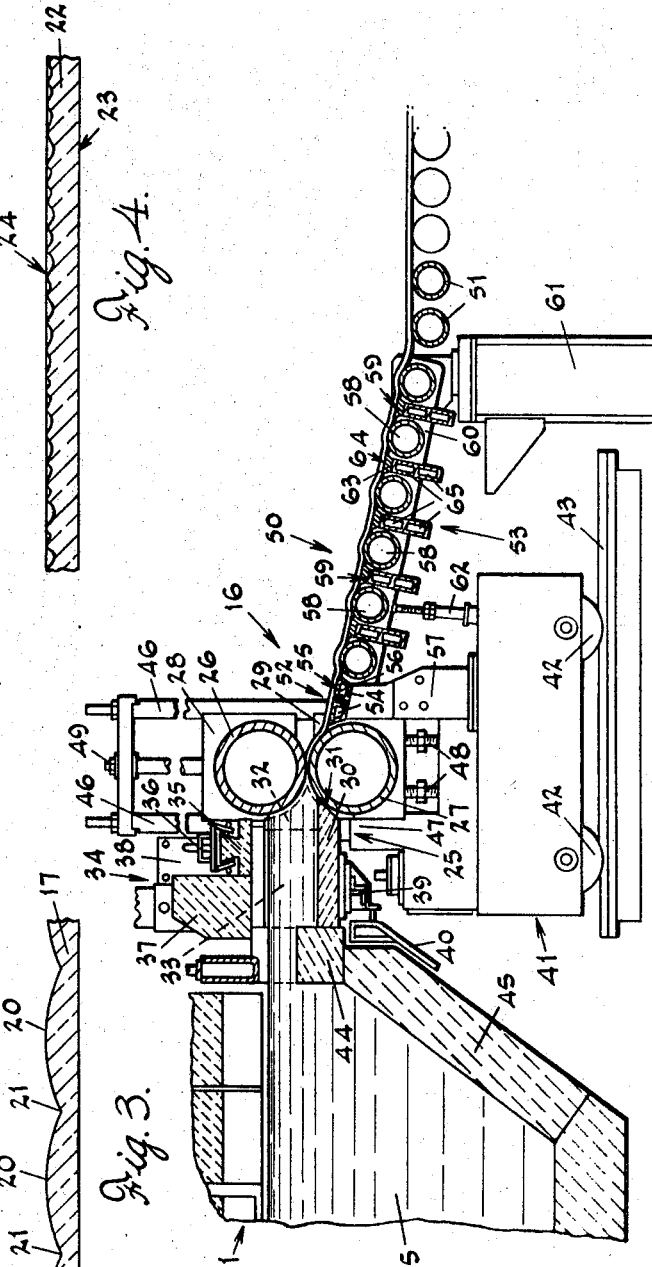
INVENTORS
Aubrey T. Bracken,
Charles L. Ray and
Conrad B. Schafer
BY
Nobbe & Swope
ATTORNEYS United States Patent Office 3,554,725
Patented Jan. 12, 1971

3,554,725
PATTERNED GLASS SHEET APPARATUS
Aubrey T. Bracken and Charles L. Ray, Toledo, and Conrad B. Schafer, Maumee, Ohio, assignors to Libbey-Owens-Ford Company, Toledo, Ohio, a corporation of Ohio
Filed June 24, 1965, Ser. No. 466,560
Int. Cl. C03b 5/32
U.S. Cl. 65—185                           9 Claims

ABSTRACT OF THE DISCLOSURE

Producing a continuous ribbon of patterned glass from a mass of molten glass contained in a plate glass furnace by delivering glass through a flow spout from the mass in said furnace to a pair of forming rolls, at least one of which has a pattern on its peripheral surface for forming a corresponding pattern on one surface of the ribbon, and gradually cooling the ribbon thus formed while conveying it across a supporting bed from the forming rolls to an annealing lehr.

---

This invention relates generally to so-called patterned glass, and more particularly to a method and apparatus for producing such glass from conventional plate glass furnaces.

Recent trends in architecture have popularized translucent or semitransparent panels in areas where it is desired to transmit light and yet maintain privacy while presenting a pleasing appearance. One material widely utilized for such purposes is patterned glass, which derives its name from the fact that there is formed on either one or both of its surfaces a design or pattern. The patterns, of which a great many are available, are generally classified as being either a smooth pattern or a rough pattern as will be hereinafter more fully described.

Unlike conventional present day plate glass, which is ground and polished after being formed as a ribbon to create desirable optical properties therein, patterned glass is formed directly into its final useable state. Since the surfaces, or at least the surface having a pattern thereon, are not finished by grinding and polishing after formation, they must not only be carefully formed but must also be very carefully handled subsequent to formation until finally set in order to produce a sheet of high quality, lustre and smoothness. To provide a product of acceptable quality, it has heretofore been necessary to produce patterned glass in a special furnace limited to that purpose. These furnaces are generally relatively small so that capacity is limited and production costs are high. In addition, these small, specialty-type furnaces are incapable of producing sheets in the large dimensions which are often desired for present day use.

It is, therefore, a primary object of the present invention to produce patterned glass from conventional continuous-type plate glass furnaces.

It is another object of the present invention to produce a continuous ribbon of patterned glass of substantially greater width than has heretofore been produced.

Another object of the invention is to provide apparatus which can be readily converted to produce either patterned glass or conventional plate glass.

Still another object of the invention is to produce patterned glass of high quality at low cost.

Yet another object of the invention is to provide apparatus readily adaptable to the production of both regular plate glass and patterned glass of any desired pattern and thickness, in a number of colors.

Other objects and advantages of the invention will become more apparent during the course of the following description, when taken in connection with the accompanying drawings.

In the drawings, wherein like numerals are employed to designate like parts throughout the same:

FIG. 1 is a longitudinal vertical sectional view of a continuous tank type furnace having sheet forming apparatus constructed according to the invention;

FIG. 2 is an enlarged fragmentary longitudinal sectional view showing the forehearth area and sheet forming apparatus of the invention;

FIG. 3 is a sectional view of a sheet of glass produced according to the invention and having a smooth pattern on one surface;

FIG. 4 is a sectional view of a sheet of glass produced according to the invention and having a rough pattern on one surface;

Figure 5:
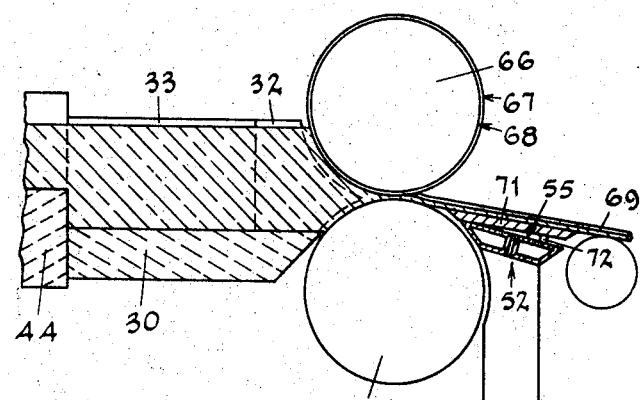
FIG. 5 is an enlarged, fragmentary, vertical sectional view of a preferred form of apparatus adapted to produce a glass ribbon having a smooth pattern on its upper surface.

According to the invention, raw glass making materials are charged into one end of a continuous tank furnace containing a bath of molten glass. The materials melt and are integrated into the molten mass within the furnace, after which they flow successively through refining and cooling areas where the molten glass is properly conditioned. Thereafter, the molten glass flows into a spout from which it is formed into a continuous ribbon by counter-rotating forming rolls. One of the forming rolls has a pattern formed on its peripheral surface, and the other generally has a smooth surface so that in passing between the rolls, the newly formed sheet has a pattern corresponding to that of the roll imprinted on its surface. It will be understood, of course, that where desired each of the forming rolls may have a pattern formed on its peripheral surface, in which case the sheet formed thereby will have a pattern on each surface. The forming rolls are positioned relative to each other and to the molten glass in the spout associated therewith so as to cause initial cooling and setting of the sheet as will be hereinafter more fully described. Thereafter, it is carried across a supporting bed for additional cooling and then into and through an annealing lehr.

Referring now to the drawings, there is shown in FIG. 1 apparatus for producing patterned glass according to the invention. The apparatus, illustrated generally at 10, includes a continuous tank furnace 11 of the type commonly employed in the production of plate glass, and a lehr 12 through which the newly formed sheet is carried for purposes of annealing. Raw glass making materials charged into a doghouse or feeding area 13 at one end of the furnace are melted by flames from burner ports 14 to form a mass of molten glass 15 within the furnace in the customary manner. The molten glass is properly conditioned as it flows throughout length of the furnace and is then rolled into a continuous ribbon by patterned glass forming equipment located at the opposite end of the furnace and illustrated generally at 16.

As pointed out previously, any number of patterns may be produced according to the invention, and these patterns fall into two basic categories which are illustrated generally in FIGS. 3 and 4. In the so-called smooth pattern of FIG. 3, the sheet 17 of glass has one surface 18 which is planar while the other surface 19 is smooth but is formed with ridges 20 and valleys 21 to create a corrugated appearance. A sheet 22 having the rough pattern of FIG. 4, on the other hand, has one surface 23 which is planar while the opposite surface 24 is flat but rough. In other words, the sheet is of substantially uniform thickness throughout, but one surface is roughened according to a desired pattern.

The actual sheet forming and conveying equipment 16 of the invention is best shown in FIG. 2. A flow spout 25 is positioned so as to form a channel for conveying a stream of molten glass from the main body of molten glass 15 in the furnace 11 to counter-rotating upper and lower forming rolls 26 and 27, respectively. The upper and lower forming rolls are journaled at the ends in bearing assemblies 28 and 29, respectively, in a conventional fashion and driven in any well known manner (not shown). The spout is formed by a spout block 30 having a contoured edge 31 abutting the lower forming roll 27, and conventional side retaining blocks 32 and shoulder blocks 33 at either end to confine the molten glass stream along the sides. Positioned over the molten glass in the spout is a cover assembly, illustrated generally at 34, and including a cap 35 carried by a support bridge 36 and a block 37. The cover assembly is supported at its ends by a framework 38 suitably secured to the superstructure of the furnace. The flow spout, comprising the spout block, side retaining blocks and shoulder blocks, is carried by means of a frame structure 39 adjustably mounted in a suitable manner on brackets 40 secured to the furnace superstructure.

The forming rolls 26 and 27 are supported on a carriage shown generally at 41. Flanged wheels 42 of the carriage run on rails 43 extending longitudinally of the furnace so that the rolls can be readily moved toward and away from the furnace, and the entire assembly is mounted on a transfer car (not shown) so that it can be laterally moved away from the furnace for repairs or replacement. Thus, the entire assembly can readily be removed and replaced by conventional plate glass forming equipment.

Both the flow spout 25 and the rolls 26 and 27 are vertically adjustable to permit control of the depth of the molten glass in the spout and behind the forming rolls as will be hereinafter described. In order to permit this vertical adjustment of the spout, the spout block 30 and side retaining blocks 32 are movable up and down along an adjacent gate block 44 which rests on the end wall 45 of the furnace. The bearing assemblies or trunnions 28 and 29 at the ends of the rolls 26 and 27 are mounted in stanchions 46 which are telescopically received in a base 47 on the carriage 41. Adjusting bolts 48 are provided beneath the trunnions at either end for vertically moving the stanchions and rolls 26 and 27, simultaneously, while the upper roll 26 is caused to independently move vertically by an adjusting screw 49 at either end which moves the bearing assemblies 28 within the stanchions 46. Thus, the rolls can be raised or lowered relative to the glass level in the furnace, and the upper roll can be moved toward and away from the lower roll to vary the thickness of the glass ribbon as desired.

As the newly formed glass ribbon emerges from the forming rolls it is, of course, at a relatively high temperature and thus is extremely pliable and soft. At this elevated temperature, the sheet is easily distorted by stretching and the surfaces, particularly the patterned surfaces, are highly susceptible to damage by contact with a supporting surface. Ordinary plate glass is generally supported in this region by passing over an inclined, smooth, hard surface or upon an air flotation tray, or even upon an ordinary roll type conveyor. The surfaces are subsequently ground and polished, and therefore minor surface defects resulting from handling prior to hardening of the sheet will be removed.

Conventional supporting means have been found unsatisfactory for patterned glass however, and according to the invention there is provided an inclined bed 50 for receiving the glass sheet from the forming rolls and supporting and cooling it until such time as it has set sufficiently to be received upon conventional lehr rolls 51 and carried through the annealing lehr 12 without damage to its surface. The bed slopes downwardly from the forming rolls to the first lehr roll at an angle sufficient to substantially overcome the frictional drag on the sheet. The bed includes a tray 52 adjacent the lower forming roll 27 which receives the glass ribbon as it separates from the roll, and a conveyor section 53.

As will be best seen in FIG. 2, the tray 52 comprises a pair of conduits 54 through which a heat absorbing medium is circulated and which combine to present a smooth upper surface 55 beneath the sheet. The conduits are formed of a durable, noncorrosive heat conducting material such as stainless steel. The rate of heat transfer from the ribbon to the heat absorbing medium is dependent upon the thickness of the top wall 56 of the conduits, a thickness in the range from ¼ inch to 1 inch having been found suitable for most purposes. As will be subsequently discussed, a layer of graphite may be placed upon the upper surface of the tray to reduce friction and drag on the sheet moving thereacross when certain patterns are produced.

It has also been discovered that the upper wall 56 of the tray may advantageously be made of a porous, fibrous metal such as that made by the Huyck Corp., of Milford, Conn. Air is then forced into the conduits and through the fibrous metal to form a cushion of air on which the ribbon is floated across the tray. In any event, the conduits are mounted on a stand 57 on the carriage 41. The stand is vertically adjustable so that the upper surface 55 of the tray can be maintained at the optimum height as the forming roll elevation is changed in producing different patterns.

The conveyor section 53, over which the sheet passes upon leaving the tray 52, is comprised of alternating rolls 58 and intermediate supports 59 as will be evident in FIG. 2. The rolls and intermediate supports are carried by a frame 60 which is pivotally mounted at one end on a pedestal 61 and is supported by suitable elevation adjustable mechanism 62 on the carriage 41 at the other end. The rolls are journaled and driven in any conventional manner, the details of which are well known and do not constitute part of the present invention. By manipulating the adjusting mechanism 62, the end of the conveyor section can be brought into proper alignment with the tray 52 so that the transition from the tray to the conveyor section will be smooth and continuous. When the sheet is discontinued for any reason, such as to change forming rolls or to repair the sheet forming equipment, the frame 60 can be disengaged from the adjusting mechanism and the conveyor section can then be pivoted upwardly out of the way.

The hollow rolls 58 are preferably made of stainless steel, chrome plated steel, or a similar material so as to resist corrosion due to the extremely high temperatures encountered. If the rolls are of stainless steel, of heat absorbing medium may be circulated therethrough in a conventional manner (not shown) so as to absorb heat from the sheet. Such cooling has been found generally unnecessary to achieve the desired heat dissipation with chrome plated rolls. The wall thickness of the rolls is very important in determining the rate of heat transfer from the sheet. Thus, the wall thickness may be ¼ inch or less where maximum cooling is desired in producing certain patterns, while for other patterns where less severe cooling is desired, the wall thickness may be ½ inch or greater. A wall thickness of about one inch has been found suitable for chrome plated rolls.

The intermediate supports 59 have a bar or plate 63 whose smooth upper surface 64 is substantially even with the tops of the rolls on either side thereof and which constitutes the actual supporting surface for the glass in this region. The supports likewise are subjected to intense heat from the sheet and the supporting surface is subjected to an abrasive action by the glass ribbon sliding thereover. While it has been found that the plates may satisfactorily be formed of stainless steel with or without an overlying layer of graphite, they are preferably made of chrome plated brass. Such plates have been found to perform extremely well in that they are good conductors of heat, can be finished to a smooth surface, and are resistant to wear by the glass ribbon. A liquid heat absorbing medium is circulated through longitudinally extending tubes 65 beneath and secured to the plate 63 in the conventional manner to maintain the plate at the proper operating temperature. The temperature of the glass ribbon is thus gradually reduced in moving across the bed 50 so that it is sufficiently set to be carried through the lehr 12 on rolls 51 without damage.

It is also within the contemplation of the invention that instead of using in the conveyor section relatively large diameter rolls separated by the intermediate supports 59, the conveyor section may be formed of rolls of somewhat smaller diameter closely spaced. The points of support are thus close enough so that for certain patterns, the sheet will not be damaged by excessive sagging between the rolls.

In producing patterned glass from a plate glass furnace, the depth of glass behind the forming rolls and the distance that the ribbon remains in contact with the rolls after formation are very important factors. According to the invention the diameter of the forming rolls 26 and 27 is about the same as in conventional plate glass apparatus, that is, about 15 inches, while the elevation of the forming rolls and the flow spout relative to the level of the molten glass in the furnace is such that the depth of molten glass behind the forming rolls is considerably greater than in the production of conventional plate glass, Thus, the actual molten glass depth in the flow spout is preferably at least 5 inches, and may be as great as 9 inches or more. The forming rolls 26 and 27 are ordinarily vertically aligned in the invention, as distinguished from conventional plate glass producing apparatus wherein the axes of the rolls are generally vertically displaced, with the upper roll being located somewhat downstream from the lower roll. With the forming rolls thus tilted, the spout is positioned so that the glass stream is shallow, and little if any molten glass is maintained behind the lower forming roll. Although the rolls are generally vertically aligned in the invention, it is contemplated that the upper roll may be displaced downstream somewhat in order to widen the sheet slightly in certain instances.

For convenience in capping, that is, cutting the continuous ribbon into individual blanks, it is preferred to form the pattern on the bottom surface. Patterns of the so-called rough variety as illustrated in FIG. 4 can satisfactorily be produced in this manner with the arrangement of spout, forming rolls and supporting bed to be hereinafter described. However, it has been found that sheets produced in this manner with smooth patterns such as shown in FIG. 3, wherein the ridges 20 and valleys 21 run longitudinally of the sheet, tend to sag in the valleys during passage of the sheet across the bed 50. This sagging is due to the reduced thickness and lack of support along the valleys, and may adversely affect the quality of the glass. Thus, it is preferred to form such smooth patterns on the upper surface of the ribbon.

There is shown in detail in FIG. 5 a preferred form of apparatus for producing smooth patterned glass according to the invention. The upper forming roll 66 is formed with annular ridges 67 and valleys 68 adapted to form the desired pattern of longitudinally extending valleys and ridges such as that shown in FIG. 3 in the upper surface of the glass ribbon 69. The lower forming roll 70 is vertically aligned with the upper roll and has a smooth surface so as to form a corresponding smooth surface on the bottom of the ribbon. By way of example, the diameter of the rolls is about 15¼ inches and the leading edge of the tray 52 adjacent the lower forming roll is about 2⅝ inches below the top of the roll.

The forming rolls and spout block 30 are positioned so that the total depth of molten glass in the flow spout behind the forming rolls is about 8½ inches. The top of the spout block 30 is about 4 inches below the top of the lower roll 70 and about 3½ inches below the top of the gate block 44. In other words, the molten glass extends down about 4 inches below the top of the lower forming roll, and upwardly somewhat less than 4½ inches on the top forming roll 66. The glass thus contacts the upper roll over an area of approximately 75° of arc.

A wearing block 71 is placed over the tray 52 in producing smooth patterns to minimize frictional drag on the sheet as it leaves the lower forming roll so that the longitudinal pattern is not distorted. The wearing block is generally made of graphite due to its natural lubricating quality and its ability to withstand high temperatures, and is originally about 1 inch thick. Due to the relatively harsh cooling effect of the forming rolls, it has been found desirable to remove the sheet from the lower roll as soon as possible after formation so that it can be cooled more gradually on the bed 50. The total length of contact of the molten glass and sheet on the lower roll is about 92° in the embodiment of FIG. 5.

In addition to normal wear, the graphite tends to oxidize at the temperatures encountered, and must frequently be replaced. To facilitate replacement, the wearing block 71, which is usually 10 or 12 feet in length, may be formed in sections 1 foot long. A 1 foot section is then periodically shoved in from one end of the tray, and the other sections are advanced across the tray and ribbon passing thereover by a similar amount and the last section is removed from the opposite end. The procedure is repeated periodically so that as each section is removed, it is substantially deteriorated. While a certain amount of wear occurs on the upper surface of the wearing block, the major cause of failure when the block lies flat on the upper surface 55 of the tray is oxidized from the under side. This oxidation has been found to be materially reduced by tilting the wearing block upwardly from the tray surface 55 by inserting spacers 72 therebetween as shown in FIG. 5.

Figure 6:
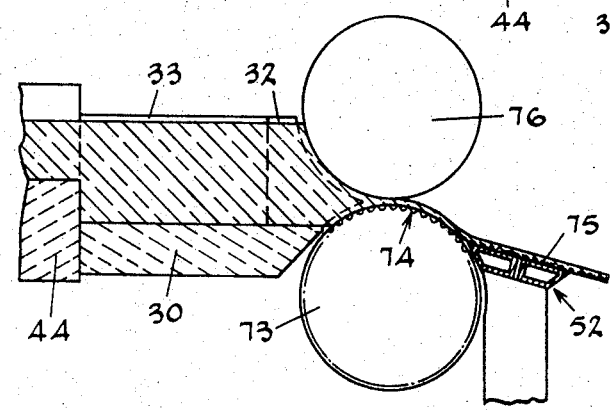
FIG. 6 is an enlarged, fragmentary, vertical sectional view of a preferred form of apparatus adapted to produce a glass ribbon having a rough pattern on its lower surface.

Although rough patterns such as those shown in FIG. 4 can be produced in the above-described manner, it has been found that the ribbon can be formed with the pattern on the lower surface without adversely affecting its quality. As pointed out previously, capping is thereby facilitated. A preferred embodiment of the invention for producing rough patterns is shown in detail in FIG. 6. As will be evident therein, a forming roll 73 having the desired pattern 74 on its surface is adapted to form a corresponding pattern on the lower surface of a sheet 75. A smooth roll 76 is mounted vertically above the roll 73 so as to form a smooth upper surface on the sheet. The total depth of the molten glass 15 in the flow spout is again about 8½ inches, but the spout block 30 is somewhat higher than in the previously described embodiment, so that the bottom of the molten glass stream is about two inches below the top of the lower roll 73. The edge of the tray 52 adjacent the roll 73 is about 3⅝ inches below the top of the roll, so that the length of contact of molten glass and ribbon on the patterned roll is about 90° of arc thereon. With a sheet thickness of approximately ¼ inch, the area of glass contact on the upper roll 76 is thus about 79° of arc.

Figure 7:
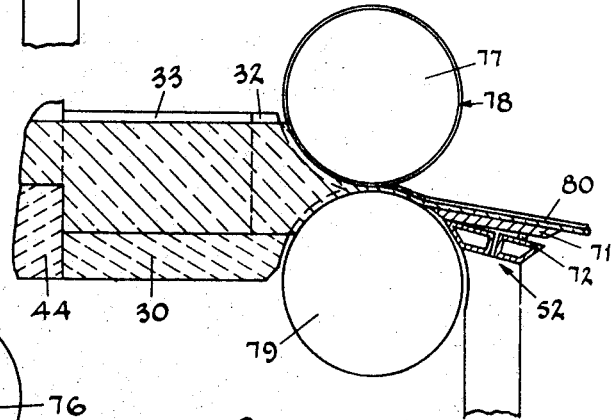
FIG. 7 is a fragmentary sectional view of an alternate embodiment of the invention for producing a ribbon with a smooth pattern on its upper surface.

There is shown in FIG. 7 an alternate embodiment of the invention adapted to produce the smooth patterned glass of FIG. 3. Again, an upper forming roll 77 having a pattern 78 on its surface is located vertically above a smooth roll 79 so as to produce a glass ribbon 80 having a flat bottom surface and a smooth pattern on its upper surface. The spout block 30 and forming rolls are positioned so as to create a somewhat greater depth of molten glass in the flow spout than in the previously described embodiment of FIG. 5. Due to its greater depth, the molten glass in the flow spout is maintained at a somewhat higher temperature. The actual depth of the molten glass in the flow spout of the embodiment of FIG. 7 is about 9 inches. The spout block is about 4½ inches below the top of the lower roll, so that the glass also extends 4½ inches above the lower roll. The top of the spout block is 4 inches below the top of the gate block 44. A wearing block 71 is again tilted upwardly from the tray 52 by spacers 72 for receiving the sheet as it leaves the lower forming roll. The upper end of the tray is about 2 inches below the top of the roll, and the wearing block is on top of the tray. As previously described, the wearing block may originally be about 1 inch in thickness, but it will be appreciated that this thickness decreases as the block oxidizes and becomes worn until it must be replaced. From the spout block to the point where the sheet leaves the roll 79, the glass contacts an arc of about 98° on the roll surface, while the area of glass contact on the upper roll 77 is about 64° of arc.

Figure 8:
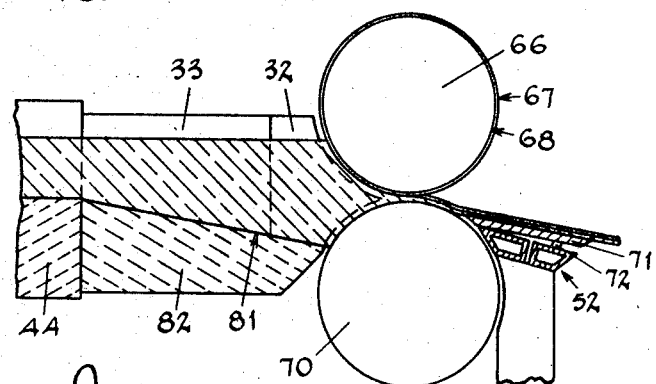
FIG. 8 is a fragmentary sectional view of still another embodiment for producing glass with a smooth pattern on one surface.

The embodiment of FIG. 8 differs from that of FIG. 5 only in that the upper surface 81 of the spout block 82 slopes downwardly from the elevation of the gate block 44 to the lower forming roll 70. The molten glass depth behind the forming rolls and area of glass contact on the rolls is identical to the embodiment of FIG. 5. The position of the tray 52 is likewise the same. The molten glass thus flows over the gate block and through the flow spout to the forming rolls in a smooth laminar flow.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. Apparatus for producing a continuous ribbon of patterned glass comprising, in combination, a tank-type plate glass furnace containing a mass of molten glass, a flow spout in communication with said tank furnace defining an open channel along which molten glass flows from said tank furnace, means for adjusting the elevation of said flow spout to regulate the depth of the molten glass in said channel, a pair of forming rolls located at the end of said flow spout for maintaining the level of the molten glass in said flow spout and furnace and withdrawing glass therefrom in a continuous ribbon, at least one of said forming rolls having a pattern on its peripheral surface for creating a corresponding pattern on a surface of the ribbon as said ribbon is formed, means for adjusting the elevation of said forming rolls relative to the level of the molten glass in said tank furnace and flow spout for controlling the depth of the molten glass behind and in contact with said forming rolls, a tray adjacent the lower one of said pair of forming rolls across which said ribbon passes as it leaves said lower forming roll, said tray comprising a pair of conduits formed of heat conducting material in side-by-side relation presenting a smooth upper surface across which the glass ribbon passes, means for circulating a heat absorbing medium through said conduits, and means for adjusting the elevation of said tray relative to said lower forming roll, and a conveyor section for carrying the ribbon from said tray to an adjacent annealing lehr, said conveyor section including a plurality of rolls with a stationary intermediate support between each pair of adjacent conveyor rolls, said intermediate support comprising a plate having a smooth upper surface and a conduit beneath each said plate with means circulating a heat-absorbing medium therethrough for removing heat from said plate.

2. Apparatus for producing a continuous ribbon of patterned glass as claimed in claim 1, including a layer of graphite on said tray beneath said ribbon across which said ribbon passes as it leaves said lower forming roll.

3. Apparatus for producing a continuous ribbon of patterned glass as claimed in claim 2, in which said layer of graphite comprises a series of individual sections extending transversely of said ribbon in end-to-end relation throughout the length of said tray.

4. Apparatus for producing a continuous ribbon of patterned glass as claimed in claim 1, in which said tray is formed of stainless steel and said plates are formed of chrome-plated brass.

5. Apparatus for producing a continuous ribbon of patterned glass as claimed in claim 1, in which said conveyor rolls are formed of stainless steel.

6. Apparatus for producing a continuous ribbon of patterned glass as claimed in claim 1, in which said conveyor rolls are chrome plated.

7. Apparatus for producing a continuous ribbon of patterned glass as claimed in claim 1, in which the diameter of said forming rolls is about 15¼ inches, and said flow spout is vertically positioned so that the depth of the molten glass in said channel behind and in contact with said forming rolls is about 8½ inches.

8. Apparatus for producing a continuous ribbon of patterned glass as claimed in claim 7, wherein said lower forming roll has a rough pattern on its peripheral surface for forming a corresponding rough pattern on the lower surface of said ribbon, the top of said lower forming roll being about 2 inches above the bottom of said channel and the edge of said tray adjacent said lower forming roll being about 3⅜ inches below the top of said lower roll whereby the molten glass contacts about 79° of arc on the upper forming roll and the molten glass and sheet contact about 90° of arc on the lower forming roll.

9. Apparatus for producing a continuous ribbon of patterned glass as claimed in claim 7, wherein the upper one of said forming rolls has a pattern on its peripheral surface for forming a smooth pattern on the upper surface of said ribbon, the top of said lower forming roll being about 4 inches above the bottom of said channel, and a layer of graphite on said tray across which said ribbon passes as it leaves said lower forming roll, said layer of graphite being about 1⅝ inches below the top of said lower forming roll, whereby the molten glass contacts about 75° of arc on said upper forming roll and the molten glass and sheet contact about 90° of arc on said lower forming roll.

References Cited

UNITED STATES PATENTS

| | | | |
|---|---|---|---|
| 488,114 | 12/1892 | Chance | 65—253 |
| 1,560,077 | 11/1925 | Gelstharp | 65—253X |
| 1,572,468 | 2/1926 | Clause | 65—253 |
| 1,670,146 | 5/1928 | Fowle | 65—193X |
| 1,928,026 | 9/1933 | Nameche | 65—253 |
| 1,999,562 | 4/1935 | Galey | 65—193X |
| 2,883,799 | 4/1959 | Wynne et al. | 65—255X |
| 3,251,667 | 5/1966 | Touvay | 65—254X |

FOREIGN PATENTS

| | | | |
|---|---|---|---|
| 8,016 | 1912 | United Kingdom | 65—93 |

FRANK W. MIGA, Primary Examiner

U.S. Cl. X.R.

65—90, 93, 101, 193, 198, 202, 253, 255, 258